United States Patent [19]
Roy

[11] 3,722,224
[45] Mar. 27, 1973

[54] SUBMARINE PIPELINE TRENCHER

[76] Inventor: Lynn H. Roy, 317 Alamo St., Lake Charles, La. 70601

[22] Filed: Feb. 8, 1971

[21] Appl. No.: 113,500

[52] U.S. Cl.............................. 61/72.4, 37/62, 37/62
[51] Int. Cl............................B63b 35/04, E02f 5/02
[58] Field of Search............61/72.4, 72.1, 72.3, 72.5; 37/62, 63, 193

[56] References Cited

UNITED STATES PATENTS

| | | | |
|---|---|---|---|
| 2,496,885 | 2/1950 | Milton | 111/88 X |
| 3,583,170 | 6/1971 | De Vries | 61/72.4 |
| 3,401,473 | 9/1968 | Schrom | 61/72.4 X |
| 3,540,226 | 11/1970 | Sherrod | 61/72.4 |
| 3,504,504 | 4/1970 | Elliott | 61/72.4 |

FOREIGN PATENTS OR APPLICATIONS

| | | | |
|---|---|---|---|
| 668,870 | 10/1964 | Italy | 111/88 |

*Primary Examiner*—Jacob Shapiro
*Attorney*—Clarence A. O'Brien and Harvey B. Jacobson

[57] ABSTRACT

A submerged bottom travelling apparatus for movement along behind a surface vessel, either by its own motive power or by towing, and operable to form and lay a pipe in a bottom trench. The apparatus includes a pair of large supporting wheels for rolling along the bottom and depressing the bottom surface along closely spaced parallel paths and weter-jet and water-vacuum structure is also provided for removal, by erosion and vacuuming, of the bottom material disposed between the paths of movement of the large support wheels on the bottom. Further, the apparatus includes guide structure operable to move along a pipe or submarine cable being unwound by the surface vehicle or a preceding surface vehicle and to guide the pipe or submarine cable into the trench being formed.

12 Claims, 8 Drawing Figures

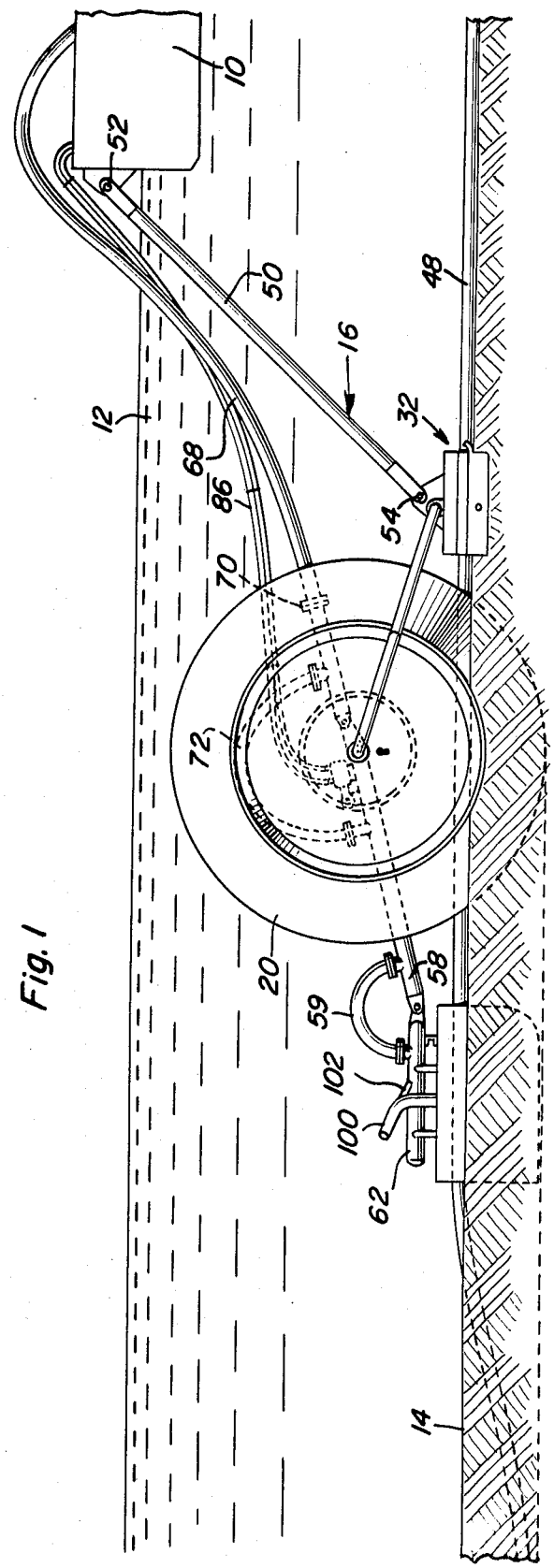
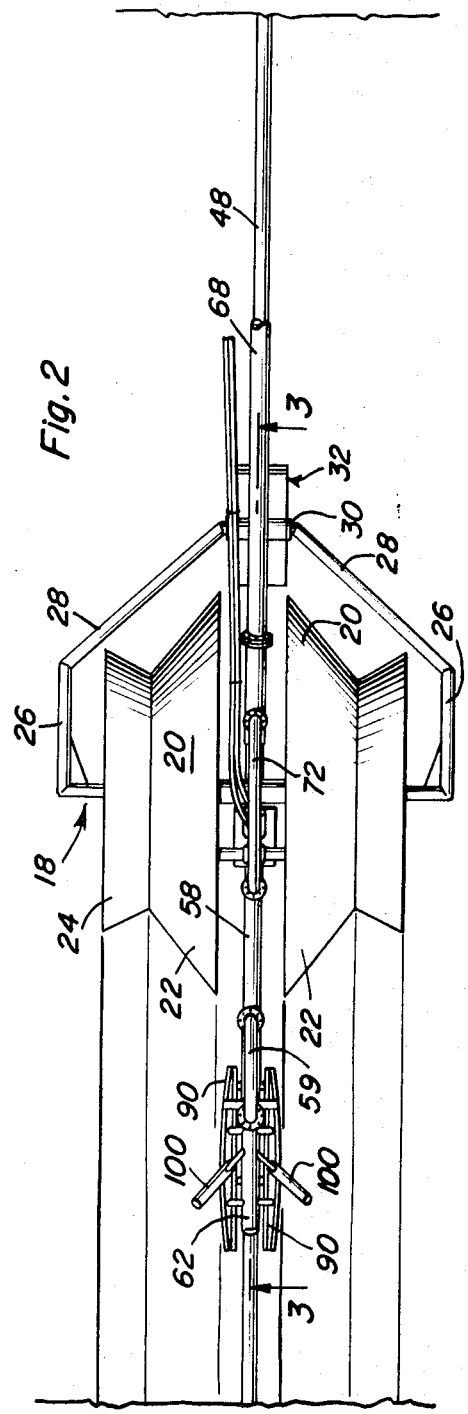
Fig. 1
Fig. 2
Lynn H. Roy
INVENTOR.
BY Clarence A. O'Brien
and Harvey B. Jacobson
Attorneys

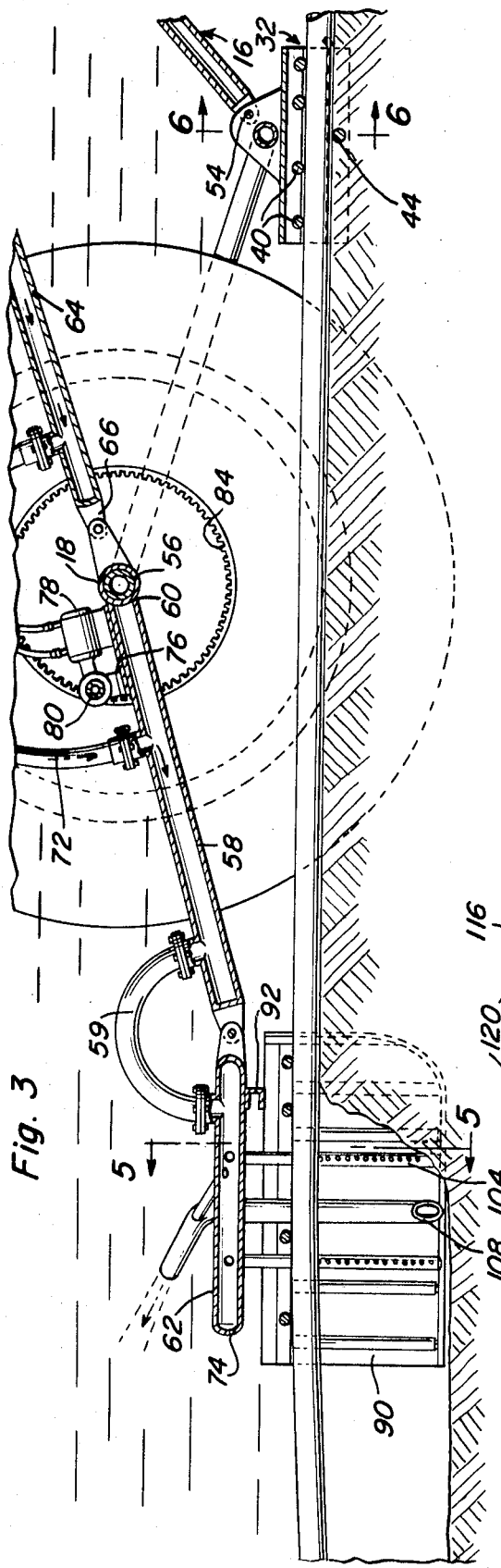

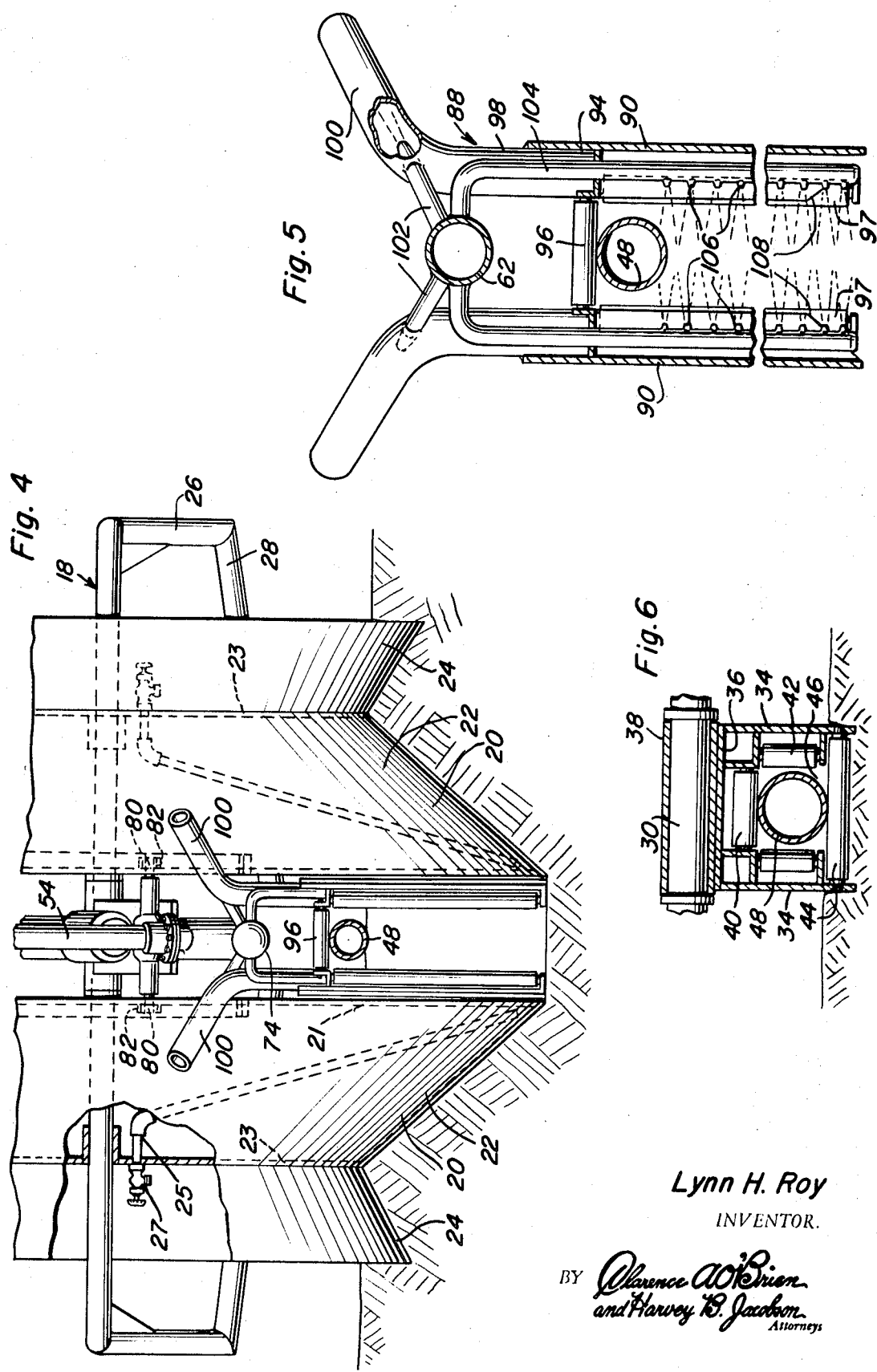

SUBMARINE PIPELINE TRENCHER

A submarine pipeline trencher of the instant invention has been specifically designed to form a trench in the bottom of a body of water and to simultaneously lay a submarine pipeline or cable within the trench formed. The trencher is designed to be towed or guided behind a surface vessel either along a predetermined course and to simultaneously form the desired trench and lay a pipeline or cable within the trench or along a prelaid pipeline or cable and to form a trench for the pipeline or cable and simultaneously lay the pipeline or cable in the trench formed.

The trencher includes opposite side support wheels which bear down in the bottom surface and the wheels are followed by a water-jet and vacuuming unit whereby the bottom material between the troughs formed by the support wheels of the trencher is removed and the water-jetting and vacuuming assembly of the trencher includes guides for movement along the pipe to be laid within the trench whereby the pipe may bend down into the trench as the latter is formed.

A somewhat modified form of the invention utilizes only the downward pressure of a pair of opposite wheels whose lower peripheral portions are beveled and disposed in rolling engagement with each other. In this manner, a single trough is formed and the associated pipeline or submarine cable may be guided into the trough behind the wheels as they roll along the bottom and form the desired trough to receive the pipeline or cable.

The main object of this invention is to provide a submarine pipeline trencher which may be economically used to form a trench in the bottom of a body of water and simultaneously guide a pipeline or cable along which the trencher is moved into the trench formed.

Another object of this invention is to provide an apparatus in accordance with the preceding objects constructed in a manner whereby the underwater trencher will be stabilized during its movement over the bottom in which the trench is being formed.

A still further object of this invention is to provide a submarine pipeline trencher constructed in a manner whereby its supporting wheels may be selectively driven or idled during movement of the trencher along a bottom surface.

A final object of the invention to be specifically enumerated herein is to provide a submarine pipeline trencher in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which FIG. 1 is a side elevational view of the trencher shown in use forming a trench and laying a submarine pipeline or cable in the trench being formed;

FIG. 2 is a top plan view of the assemblage illustrated in FIG. 1;

FIG. 3 is an enlarged fragmentary vertical sectional view taken substantially upon the plane indicated by the section line 3—3 of FIG. 2;

FIG. 4 is an end elevational view of the trencher as seen from the left side of FIG. 3;

FIG. 5 is an enlarged fragmentary transverse vertical sectional view taken substantially upon the plan indicated by the section line 5—5 of FIG. 3;

FIG. 6 is an enlarged fragmentary transverse vertical sectional view taken substantially upon the plan indicated by the section line 6—6 of FIG. 3;

FIG. 7 is a top plan view of a modified and simplified form of trencher; and

FIG. 8 is an end elevational view of the trencher illustrated in FIG. 7.

Referring now more specifically to the drawings, the numeral 10 generally designates a surface vehicle floated on a body 12 of water including a bottom 14.

The preferred form of trencher of the instant invention is generally referred to by the reference number 16 and includes an axle assembly referred to in general by the reference number 18 upon whose opposite ends a pair of large supporting wheels 20 are journaled. The wheels 20 are spaced apart axially along the axle assembly 18 and the adjacent sides of the wheels 20 include frusto-conical portions 22 which have their major diameter end portions adjacent each other and the remote sides of the wheels include frusto-conical portions 24 having their minor diameter ends secured to the minor diameter ends of the frusto-conical portions 22. Any suitable means (not shown) may be utilized to maintain the wheels 20 in desired axially spaced relation and the remote ends of the axle assembly 18 include braced forwardly directed arms 26 which in turn terminate in forwardly convergent arm extensions whose forward ends are joined by a transverse member 30 extending therebetween and upon which a forward guide shoe referred to in general by the reference numeral 32 is oscillatably supported. The guide shoe is illustrated in section in FIGS. 3 and 6 and includes a pair of standing opposite side longitudinal plates 34 interconnected along their upper marginal edge portions by means of a horizontal top plate 36 extending therebetween and having a journaled sleeve 38 secured thereto through which the transverse member 30 is oscillatably received. The guide shoe 32 includes a plurality of upper horizontal transverse rollers 40, at least one pair of opposite side upstanding rollers 42 and at least one lower horizontal transverse roller 44. The rollers 40, 42 and 44 define a passage 46 extending through the guide shoe 32 in which a submarine pipeline 48 is slidingly and guidingly received.

The trencher 16 further includes a pull or guide bar 50 having its upper end pivotally secured to the surface vessel 10 as at 52 and the lower end of the bar 50 is secured to the guide shoe 32 as at 54. Accordingly, it may be seen that the trencher 16 will be guided along the bottom 14 behind the surface vessel 10.

The trencher 16 includes a sleeve 56 oscillatable on the axle assembly 18 between the wheels 20. A tubular support bar 58 including relatively articulated front and rear ends has its forward end secured to the sleeve 56 as at 60 and its rear end defines a water manifold 62, a flexible hose 59 communicating the interiors of the front and rear ends of the bar 58.

A tubular inlet pipe 64 has one closed end oscillatably supported from the sleeve 56 as at 66 and the other end of the pipe 64 is open and coupled to the rear end of a water supply line 68 trailed from the vessel 10 as at 70. It is, of course, to be noted that the water supply line 68 is provided with a source of water under pressure from the vessel 10.

The rear end of the pipe 64 and the forward end of the bar or pipe 58 are communicated by a flexible conduit 72 and accordingly, water pumped downwardly through the line 68 will be conveyed to the water manifold 62 which has its rear end closed as at 74.

A mounting plate 76 is carried by the forward end of the bar 58 and a hydraulic motor gear head assembly 78 is mounted on the mounting plate 76 in any convenient manner and drives a pair of stub axles 80 projecting horizontally outwardly from opposite sides of the assembly 78 and having gear wheels 82 mounted on their remote ends mashed with ring gears 84 carried by the wheels 20. Additionally, a pair of hydraulic lines 86 extend from the vessel 10 to the assembly 78 and it is to be understood that the vessel 10 will also be provided with a source of hydraulic fluid under pressure whereby the wheels 20 may be driven by the assembly 78 as controlled from the vessel 10.

The water manifold 62 comprises the support for a water-jet and a vacuuming unit referred to in general by the reference numeral 88. The unit 88 includes a pair of upstanding opposite side plates 90 interconnected by means of a horizontal transverse brace 92 extending between and secured to the upper marginal edge portions of the plates 90, see FIG. 3. In addition, each of the side plates 90 includes an inwardly projecting angle iron support 94 and a plurality of rollers 96 are supported between and journaled from the supports 94. Still further, the side plates 90 include upstanding vacuum tubes 98 secured to their adjacent sides and provided with upwardly and outwardly as well as rearwardly inclined discharge ends 100 and a pair of similarly inclined water-jet pipes have one pair of ends thereof secured to and opening into the water manifold 62 while the other pair of ends thereof open through the upper ends of the vacuum tubes 98 and are directed axially along the discharge ends 100 of the tubes 98. Still further, front and rear pairs of opposite side supply tubes 104 extend downwardly from the water manifold 62 and include vertically spaced waterjet outlet nozzles 106 which open transversely of the unit 88 toward the opposite sides thereof. The intermediate portions of the tubes 104 are also supported from the angle iron support 94 and the lower ends of the tubes 104 are closed when the lower ends of the vacuum tubes 98 are open and beveled as at 108.

In operation, and assuming that the pipeline 48 has been previously laid, the trencher 16 is operatively associated with the pipeline 48 in the manner illustrated in FIGS. 1, 3, 5 and 6 of the drawings with the guide shoe 32 guidingly engaged with one portion of the pipeline 48 and the unit 88 guidingly engaged with a rear portion of the pipeline 48. Then, the surface vessel 10 may be propelled forwardly and hydraulic fluid under pressure supplied to the assembly 78 whereby motive force will be imparted to the wheels 20. As the wheels 20 roll along the bottom 14, they will form depressed paths in the bottom 14 closely adjacent the opposite sides of the path along which the trailing unit 40 moves. The unit 40 is received downwardly in these depressed areas and water-jetted from the jets 106 erodes away the bottom material between the depressed areas caused by the wheels 20. However, water is also discharged through the jet pipes 102 into the discharge ends 100 of the vacuum tubes 98 and thus create a reduced pressure in the bottom ends of the vacuum tubes 98 whereby the bottom material loosened by the water-jet being discharged from the jets 100 will be vacuumed into the tubes 98 for lateral and rearward discharge from the discharge ends 100 of the vacuum tubes 98. Of course, inasmuch as the guide shoe 32 and unit 88 are guidingly engaged with the pipeline 48, the trench being formed is formed immediately beneath the pipeline 48 whereby that portion of the pipeline 48 disposed rearward of the unit 88 may bend downward into the trench formed, If it is desired, the vessel 10 may be utilized to tow the trencher 16 along the bottom 14. However, it has been found that by driving the wheels 20, more efficient operation of the trencher 16 is realized.

The specific shape of the wheels 20 of the trencher 16 causes those portions of the bottom 14 extending along opposite sides of the trench being formed to be depressed as well as compacted between corresponding wheel portions 22 and 24 and thus stability of the trencher 16 is assured. Of course, the plates 90 prevent the bottom material from falling into the trench formed before the pipeline 48 may bend downward into the latter and also prevents the jets 106 from disturbing the bottom material disposed outwardly of the side plates 90 to thus assure a more stable placement of the pipeline 48 in the trench.

With attention now invited more specifically to FIGS. 7 and 8 of the drawings, it may be seen a modified form of a trencher referred to in general by the reference numeral 110. The trencher 110 includes a main longitudinal and tubular support beam 112 through which the associated pipeline 48 is slidingly received. The support beam 22 includes a pair of downwardly and outwardly inclined axles 114 provided with skids 116 on their lower ends and a pair of beveled wheels 118 including rollingly engaged lower peripheral portions are journaled on the axles 114. The front and rear ends of the skids 116 are braced by means of diagonal bracing members 120 secured between the axles 114 and the front and rear ends of the skids 116 and the forward end of the support beam 112 is braced relative to the forward ends of the skids 116 by means of diagonal bracing members 122 extending between the forward end of the beam 112 and the forward bracing members 120.

In operation, the trencher 110 is towed by means of a cable 124 along the pipeline 48 with the lower peripheral portions of the wheels 118 disposed in rolling contact with each other and the lower peripheral portions of the wheels 118 accordingly form a sharp V-shaped trench 126 in the bottom 14 in which to receive those portions of the pipeline 48 disposed rearwardly of the tubular support beam 112.

Accordingly, it may be seen that the operation of the trencher 110 is generally similar to the operation of the trencher 16 although the former is not provided with water-jet means for jetting away portions of the bottom 14 in order to form a deeper trench.

The water-jet and vacuuming unit 88, in addition to including the rollers 96, includes longitudinally spaced vertically disposed opposite side rollers 97 which extend substantially the full vertical height of those portions of the side plates 90 projecting below the rollers 96. The rollers 97 have their upper ends journaled from the supports 94 and their lower ends journaled from inwardly projecting brackets carried by the lower marginal edge portions of the side plates 90. Of course, the submarine pipeline 48 is received between the opposite side rollers 97 whereby the latter may guide on the pipeline 48.

In addition, the wheels 20 include inner and outer side plates 21 and 23, see FIG. 4, wherein each of the wheels 20 defines a closed chamber and each of the chambers is provided with a water inlet and outlet pipe 25. Each pipe 25 includes an inner end disposed at an outer peripheral portion of the corresponding wheel chamber and an exposed end opening through the corresponding side plate 23 adjacent the axle assembly 18 and provided with a valve assembly 27. Of course, if the bottom 14 is relatively hard, the interior chambers of the wheels 20 may be filled with water so that substantially the entire weight of the submerged trencher may bear downward upon the bottom 14 at the lower peripheral portions of the wheels 20. However, if the bottom 14 is relatively soft, all or a portion of each chamber may contain air so as to render the trencher lighter when submerged and thereby limit the amount of wheels 20 will depress the bottom 14 as the trencher is moved therealong.

As an alternate, instead of using water under pressure pumped through the supply tubes 104 and out the nozzles 106 for eroding and loosening the bottom material between the plates 90 for suction into the beveled lower ends 108 of the vacuum tubes 98, water pressure supplied to the trencher 16 may be used solely to form the necessary vacuum in the lower ends of the tubes 98 and a surface powered and trencher mounted ultra-sonic sound unit may be used to loosen the bottom material disposed between the plates 90. Further, the trencher could be provided with a trencher mounted hydraulic powered water pump for supplying water under pressure to the water manifold 62 and eliminate the need for hose 68.

Further, if the trencher 16 is to be pulled from the surface vessel 10 and not have its wheels 20 driven from the motor 78, the pull or guide bar 50 may be eliminated. The guide bar 50 is needed only if the motor 78 is inoperative or eliminated. However, when the trencher 16 does have its wheels powered from the motor 78 and a trencher mounted hydraulic motor driven pump is utilized to supply water under pressure to the manifold pipe 62, the only surface-to-trencher power transmission means required is hydraulic fluid pressure lines, thereby creating a more efficient apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A submerged bottom engaging device for movement behind a surface vessel, said device including guide means for slidably engaging a submarine pipeline and guiding said device along said pipeline, and trench forming means carried by said guide means and projecting below the latter operable to form a trough in the bottom along which said device is being advanced, whereby said pipeline, rearward of said device, may be downwardly deflected by gravity into said trough, said guide means comprising a front to rear extending generally horizontal tube for lengthwise slidingly receiving said pipeline therethrough, said trench forming means including a pair of opposite side downwardly and outwardly inclined axle portions carried by said tube and a pair of large diameter support wheels journaled on said axle portions, the adjacent sides of the outer peripheral portions of said wheels being beveled and the lower marginal portions of the beveled sides of said wheels being disposed in closely opposing relation, whereby said lower marginal portions will coact to form a single trench in the soft bottom as said device is moved therealong.

2. The combination of claim 1 wherein said device includes opposite side front to rear extending skids spaced outwardly of said wheels and whose undersurfaces are disposed in a plane spaced above the lowest marginal portions of said wheels.

3. The combination of claim 2 wherein the front end portion of said tube includes means adapted to have a tow cable anchored thereto.

4. The combination of claim 1 wherein said trench forming means further includes bottom eroding means operable to loosen the soft bottom material disposed between said paths and vacuum means operable to draw away, by vacuuming, the loosened bottom material between said paths closely behind said wheels.

5. The combination of claim 4 wherein said eroding means includes water-jet means operable to discharge vertically spaced jets of water transversely of the central zone between said paths from opposite sides of said zone.

6. The combination of claim 5 wherein said eroding means further includes upstanding longitudinally extending baffle plates disposed closely adjacent and slightly outwardly of the water-jet means at opposite sides of said zone, whereby the soft bottom material disposed outwardly of said central zone will not be eroded by said water-jet means.

7. The combination of claim 6 wherein said guide means includes means operable to lengthwise slidingly engage said pipeline at a point disposed between the upper marginal portions of said baffle plates.

8. The combination of claim 7 including motor means drivingly connected to said wheels.

9. A submerged bottom engaging device for movement behind a surface vessel, said device including guide means for slidably engaging a submarine pipeline and guiding said device along said pipeline, and trench forming means carried by said guide means and projecting below the latter operable to form a trough in the bottom along which said device is being advanced, whereby said pipeline, rearward of said device, may be downwardly deflected by gravity into said trough, said trench forming means including a pair of opposite side large diameter support wheels adapted to depress the soft bottom surface over which the device is advanced along laterally spaced parallel paths, said trench forming means further including bottom eroding means operable to loosen the soft bottom material disposed between said paths and vacuum means operable to draw away, by vacuuming, the loosened bottom material between said paths closely behind said wheels, said eroding means including water-jet means operable to discharge vertically spaced jets of water transversely of the central zone between said paths from opposite sides of said zone, said eroding means further including upstanding longitudinally extending baffle plates disposed closely adjacent and slightly outwardly of the water-jet means at opposite sides of said zone, whereby the soft bottom material disposed outwardly of said central zone will not be eroded by said water-jet means, said guide means including means operable to lengthwise slidingly engage said pipeline at a point disposed between the upper marginal portions of said baffle plates, motor means drivingly connected to said wheels, said device including a transverse axle assembly, said wheels being journaled from opposite ends of the transverse axle assembly, said guide means and eroding means as well as said vacuum means being supported from the rear end of an elongated front to rear extending support whose front end is oscillatedly supported from said axle assembly.

10. The combination of claim 9 wherein said device includes a second guide means for slidably and guidingly engaging said pipeline, said second guide means also defining a bottom engaging slide, a forwardly and downwardly inclined elongated support member having its rear end oscillatably supported from said axle assembly, said second guide means being oscillatably supported from the forward end of said forwardly and downwardly inclined support member.

11. A submerged bottom engaging device for movement behind a surface vessel, said device including guide means for slidably engaging a submarine pipeline and guiding said device along said pipeline, and trench forming means carried by said guide means and projecting below the latter operable to form a trough in the bottom along which said device is being advanced, whereby said pipeline, rearward of said device, may be downwardly deflected by gravity into said trough, said trench forming means including a pair of opposite side large diameter support wheels adapted to depress the soft bottom surface over which the device is advanced along laterally spaced parallel paths, said trench forming means further including bottom eroding means operable to loosen the soft bottom material disposed between said paths and vacuum means operable to draw away, by vacuuming, the loosened bottom material between said paths behind said wheels, said eroding means including upstanding longitudinally extending baffle plates disposed closely adjacent and slightly outwardly of the water-jet means at opposite sides of said zone, whereby the soft bottom material disposed outwardly of said central zone will not be eroded by said water-jet means.

12. The combination of claim 11 wherein said device includes second guide means for slidably and guidingly engaging said pipeline, said second guide means also defining a bottom engaging slide, a forward and downwardly inclined elongated support member having its rear end oscillatably supported from said axle assembly, said second guide means being oscillatably supported from the forward end of said support member.

* * * * *